United States Patent [19]
Omote

[11] Patent Number: 5,944,630
[45] Date of Patent: Aug. 31, 1999

[54] CONTROL SYSTEM OF VEHICLE DRIVING SYSTEM

[75] Inventor: Kenji Omote, Anjo, Japan

[73] Assignee: Aisin AW Co., Ltd., Anjo, Japan

[21] Appl. No.: 09/030,812

[22] Filed: Feb. 26, 1998

[30] Foreign Application Priority Data

Feb. 26, 1997 [JP] Japan ..................................... 9-057117

[51] Int. Cl.$^6$ ................................................. B60K 41/02
[52] U.S. Cl. .............................. 477/5; 74/335; 74/336 R
[58] Field of Search ................................. 477/5; 74/335, 74/336 R

[56] References Cited

U.S. PATENT DOCUMENTS

| | | | |
|---|---|---|---|
| 5,713,814 | 2/1998 | Hara et al. | 477/5 X |
| 5,720,690 | 2/1998 | Hara et al. | 477/20 |
| 5,735,770 | 4/1998 | Omote et al. | 477/5 |
| 5,771,478 | 6/1998 | Tsukamoto et al. | 477/3 X |
| 5,813,943 | 9/1998 | Kousaka et al. | 477/156 |
| 5,846,155 | 12/1998 | Taniguchi et al. | 477/2 |

*Primary Examiner*—Charles A. Marmor
*Assistant Examiner*—Ha Ho
*Attorney, Agent, or Firm*—Oliff & Berridge, PLC

[57] ABSTRACT

In a vehicle driving unit employing a driving source formed by combining an engine with a motor generator, a control system prevents a sharp decline of an output torque of a transmission at the end of a shift operation without extending a time period required for the shift operation. The shift shock resulting from the sharp decline of the output torque can be eliminated. The vehicle driving unit is provided with an engine, a motor generator and a multi-stage automatic transmission for accomplishing a predetermined speed by engagement of friction engagement elements. The control system includes a shift operation termination determination step for determining the length of time remaining until the termination of a shift operation being performed by engagement of the friction engagement elements and a torque output command step for generating a torque assistance command to the motor generator based on the determination made during the shift operation termination determination step such that the transmission output torque decreases gently from a predetermined torque value. An assistance torque is outputted to prevent the sharp decline of the transmission output torque at the end of the shift operation caused by the inertia torque being rapidly absorbed by the friction engagement elements.

15 Claims, 7 Drawing Sheets

CONTROL SYSTEM OF VEHICLE DRIVING SYSTEM

BACKGROUND OF THE INVENTION

1. Field of Invention

The invention relates to a vehicle driving unit which employs a driving source formed by combining a combustion engine (hereinafter referred to as an engine) with a motor generator and a multi-stage automatic transmission for accomplishing a plurality of speeds. More specifically, the invention relates to a control system of the vehicle driving unit.

2. Description of Related Art

Generally employed vehicle driving units include a hydraulic driving unit which combines a driving source formed of an engine and a motor generator with a multi-stage automatic transmission. The motor generator of the driving unit of this type can be used as a generator which recovers braking energy from wheels and accumulates it as electric power. The motor generator is driven by the accumulated power to start the engine and drive the vehicle.

As previously designed, the aforementioned hybrid vehicle driving unit may use a torque converter as a starting device which inputs a driving torque of the driving source formed by the engine and the motor generator into the automatic transmission. Alternatively, a power split device formed by combining a planetary gear with a clutch can be used in the driving unit of the aforementioned type.

Unlike the torque converter, the power split device does not retard revolution change resulting from fluid slippage when the automatic transmission performs a shift operation while the engine is being driven. As the input revolution changes, the inertia torque generated by an inertia moment at the front side of the transmission such as an engine and a fly wheel during the shift operation is directly input to the transmission. On the other hand, the input inertia torque is rapidly absorbed by the engaging elements at the end of the shift operation. Such a sharp change in the torque may cause a great shift shock.

However, a shift shock resulting from rapid absorption of the inertia torque, though on a relatively small level, occurs also in a generally employed multi-stage automatic transmission provided with a general torque converter having only an engine as a driving source. In order to eliminate the aforementioned shift shock, the generally employed automatic transmission is provided with various kinds of devices for controlling an engagement hydraulic pressure applied to the friction engagement elements. In case of following the general solution as aforementioned to eliminate the shift shock which occurs in the hybrid vehicle driving unit, the engagement pressure applied to the friction engagement elements is decreased immediately after the end of the shift operation to reduce a rate of the revolution change. This may prevent the output torque from sharply declining.

FIG. 7 is a timing chart showing the relationship between characteristics of an engagement hydraulic pressure (Pa) of the friction engagement elements, an engine revolution (Ne) and a transmission output torque (Tout). It is assumed that the engagement hydraulic pressure (Pa) of a clutch or a brake as the friction engagement element decreases from the level of the general characteristic shown by a chain line to the level shown by a solid line at a later stage of the engagement phase as the arrow indicates. Then, a sharp decline of the transmission output torque (Tout) resulting from absorption of the inertia torque shown by a chain line can be modified to a gentle decline shown by a solid line.

In the case where the aforementioned method is adopted to inhibit the shift shock resulting from absorption of the inertia torque, the transmission output torque (Tout) characteristic may cause the time required for the shift operation to be longer by (t) than the case where generation of the inertia torque is not retarded as shown by the chain line. Accordingly, the time period during which the friction engagement elements slip is extended by the time (t). This may adversely affect the durability of the friction materials constituting the respective elements.

SUMMARY OF THE INVENTION

A first object of the invention is to provide a control system of a vehicle driving unit employing a driving source formed of an engine and a motor generator, which eliminates a shift shock by preventing a sharp decline of a transmission output torque at the end of a shift operation without extending the time required for the shift operation.

A second object of the invention is to prevent the sharp decline of the transmission output torque in accordance with an inertia torque input to the automatic transmission.

A third object of the invention is to keep a decrease rate of the transmission output torque constant in order to prevent the aforementioned sharp decline.

A fourth object of the invention is to cause a motor generator to apply a torque (torque assistance) in accordance with the inertia torque input to the automatic transmnission.

A fifth object of the invention is to reduce the inertia torque itself input to the automatic transmission system.

In order to accomplish the first object, there is provided a control system of a vehicle driving unit which employs a driving source formed by combining an engine with a motor generator, and a multi-stage automatic transmission for accomplishing a predetermined speed by engagement of friction engagement elements. The control system includes shift operation termination determination means for determining the time until the shift operation is terminated and torque output command means for generating a torque output command to the motor generator based on a determination of the time left until termination of the shift operation made by the shift operation termination determination means such that an output torque decreases gently from a predetermined torque value.

In order to accomplish the second object, the control system includes input revolution detection means for detecting an input revolution of the automatic transmission and inertia torque calculation means for calculating an inertia torque input to the automatic transmission during a shift operation based on a change in input revolution detected by the input revolution detection means. A predetermined torque is defined as an output torque corresponding to the inertia torque calculated by the inertia torque calculation means.

In order to accomplish the third object, the control system includes a torque decrease rate setting means for setting a rate at which an output torque decreases gently, and based on a decrease rate set by the torque decrease rate setting means, the torque output command means sends a torque output command to a motor generator such that the output torque decreases at a constant rate every time a shift operation is performed.

In order to accomplish the fourth object, the control system includes output command selection means for comparing an inertia torque during a shift operation calculated by inertia torque calculation means with a predetermined inertia torque value, and for stopping transmission of an output command from the torque output command means when the calculated inertia torque is equal to or less than the predetermined value.

In order to accomplish the fifth object, the torque output command means generates a torque output command (S24) such that an output torque of the motor generator becomes negative during a shift operation.

The invention allows the output torque after the end of the shift operation to be reduced gently by torque assistance of the motor generator. As a result, the shift shock resulting from absorption of the inertia torque by the friction engagement elements can be eliminated.

Furthermore, the output torque can decrease gently even after the absorption of the inertia torque.

Also, the decrease rate of the output torque, that is, a descending gradient of the output torque is kept constant every time a shift operation is performed. Therefore, the output torque can decrease gently even if a greater inertia torque is applied. In the case where the decrease rate of the output torque varies every time the shift operation is performed, a driver may feel uneasy. The invention is able to relieve the driver of such uneasiness resulting from the shift operation.

In addition, application of the torque assistance after the end of the shift operation can be prohibited during the shift operation at a low inertia torque, namely, when the shift shock is substantially negligible. Therefore, the motor generator does not have to output unnecessary torque, leading to power reduction.

Furthermore, it is possible to reduce the torque input to the automatic transmission by the amount of the inertia torque by means of a negative torque output from the motor generator, that is, torque-down control executed by the motor generator serving as the generator.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
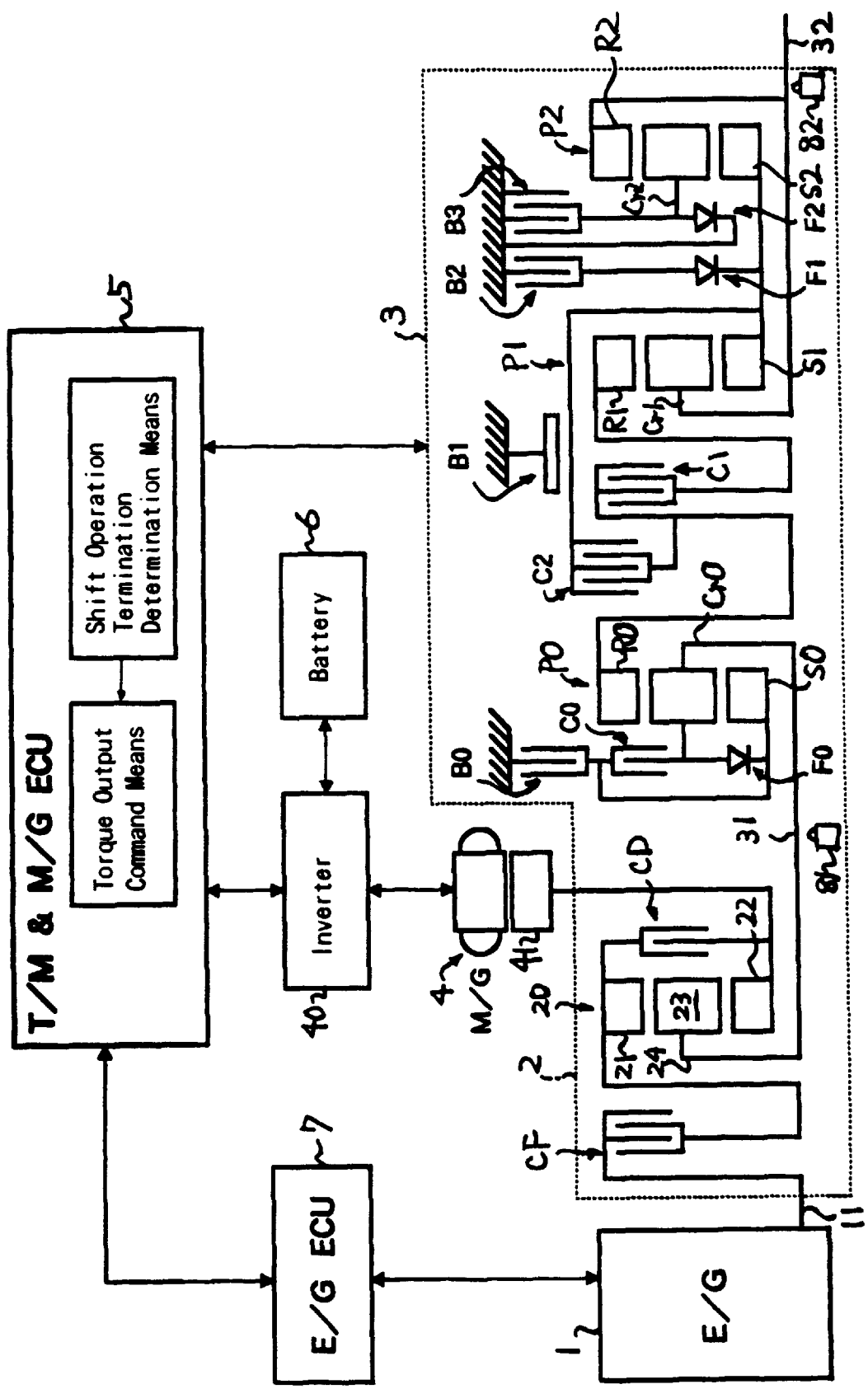
FIG. 1 is a block diagram showing a structure of a vehicle driving unit according to a first embodiment of the invention.

Preferred embodiments of the invention will be described referring to the drawings. FIG. 1 is a block diagram showing an entire structure of a vehicle driving unit according to a first embodiment of the invention. The driving unit includes an engine (E/G) 1, an automatic transmission 3 for transmitting motor power of the engine 1 to wheels (not shown), and a motor generator (M/G) 4 of a permanent magnet synchronous motor type functioning as a motor for driving the engine 1 and wheels via the automatic transmission 3 and functioning as a generator for recovering inverse driving energy from the engine 1 and the wheels. In the aforementioned driving unit, the engine 1, the motor generator 4, and the automatic transmission 3 are controlled by a control system 5(T/M&M/G-ECU).

In the vehicle driving unit, the automatic transmission 3 is connected to a driving source, that is, the engine 1 and the motor generator 4 via a power split device 2 functioning as a starting device. The power split device 2 is connected to the engine 1 via a forward clutch (CF) and is provided with a planetary gear unit 20 which is connected to the motor generator 4 and the automatic transmission 3. The planetary gear unit 20 has a simple construction including rotating elements such as a ring gear 21, a sun gear 22, and a carrier 24 of a pinion gear 23 which engages with the ring gear 21 and the sun gear 22. The ring gear 21 is connected to an output shaft 11 of the engine 1 via the forward clutch (CF), the sun gear 22 is connected to a rotor 41 of the motor generator 4 and the carrier 24 is connected to an input shaft 31 of the automatic transmission 3 respectively. A lock-up clutch (CD) for engaging/disengaging the ring gear 21 with/from the sun gear 22 is provided such that the planetary gear unit achieves locked-up rotation or planetary rotation.

The control system for controlling the above-described driving unit is mainly formed of an electronic control system (T/M&M/G-ECU) 5 which controls the motor generator 4 via an inverter 40 and controls friction engagement elements of the automatic transmission 3 via a hydraulic control device. The control system is further provided with a battery 6 for storing energy recovered by the motor generator 4 as electric power and supplying the power to drive the motor generator 4, the inverter 40 constituting control means of the motor generator 4, the hydraulic control device constituting control means of the automatic transmission 3, and an engine control computer (E/G-ECU) 7 for sending/receiving information to/from the electronic control system 5. Additionally, the control system includes, as information detection means for control operations, an input revolution sensor 81 for detecting an input revolution of the input shaft 31 of the automatic transmission 3, a vehicle speed sensor 82 serving as output revolution detection means for detecting a vehicle speed in accordance with a revolution of the output shaft 32 of the automatic transmission 3, and a neutral start switch (not shown) for detecting a shift position of the automatic transmission 3.

The vehicle driving unit constructed as described above enables it to select engagement or disengagement of the forward clutch (CF) and the lock-up clutch (CD) of the power split device 2 so as to realize various running states. These running states include a motor mode running state where only the motor generator 4 performs a driving operation, a split mode running state where the engine 1 mainly performs the driving operation but the motor generator 4 also performs the driving or braking operation partially, a parallel hybrid mode running state where both the engine 1 and the motor generator 4 perform the driving operation, an engine mode running state where only the engine 1 performs the driving operation, and a recovery mode running state where the motor generator 4 performs a dynamic braking operation.

The automatic transmission 3 with four speeds according to the first embodiment employs two planetary gears (P1, P2) as shift elements. The automatic transmission 3 is formed by combining a shift mechanism with a planetary gear (P0). The shift mechanism including three forward speeds and one reverse speed is controlled by engagement/disengagement of a plurality of clutches and brakes as friction engagement elements which are controlled according to the invention. The planetary gear (P0) constitutes an overdrive mechanism similarly controlled by engagement/disengagement of a plurality of clutches and brakes. In the planetary gear (P0), a carrier (Cr0) connected to the input shaft 31 of the transmission 3 and a sun gear (S0) are connected with each other via a clutch (C0) and a one-way clutch (F0) that are disposed in parallel. The sun gear (S0) can be arrested by a brake (B0). A ring gear (R0) constituting an output element of the planetary gear (P0) is connected to a ring gear (R1) of a planetary gear (P1) via a clutch (C1) and is connected to sun gears (S1, S2) via a clutch (C2). A sun gear (S2) and a ring gear (R2) of a planetary gear (P2) are respectively connected to the sun gear (S1) and a carrier (Cr1) of the planetary gear (P1). The ring gear (R2) constitutes the output element of the automatic transmission 3. The sun gears (S1, S2) can be arrested by a brake (B1) via a one-way clutch (F1) and a brake (B2) that are disposed in series. A carrier (Cr2) of the planetary gear (P2) can be arrested by a one-way clutch (F2) and a brake (B3) that are disposed in parallel.

The control system of the invention is provided with shift operation termination determination means for determining how much time remains until the shift operation is terminated (at step S6, which will be described later) and torque output command means (at step S10, which will also be described later) for generating a torque output command to the motor generator such that the output torque decreases gently from a predetermined torque value in response to a determination that the shift operation is about to terminate, as made by the shift operation termination determination means. These means are formed as control programs installed in the electronic control system 5. The control programs will be described referring to flowcharts and timing charts.

Figure 2:
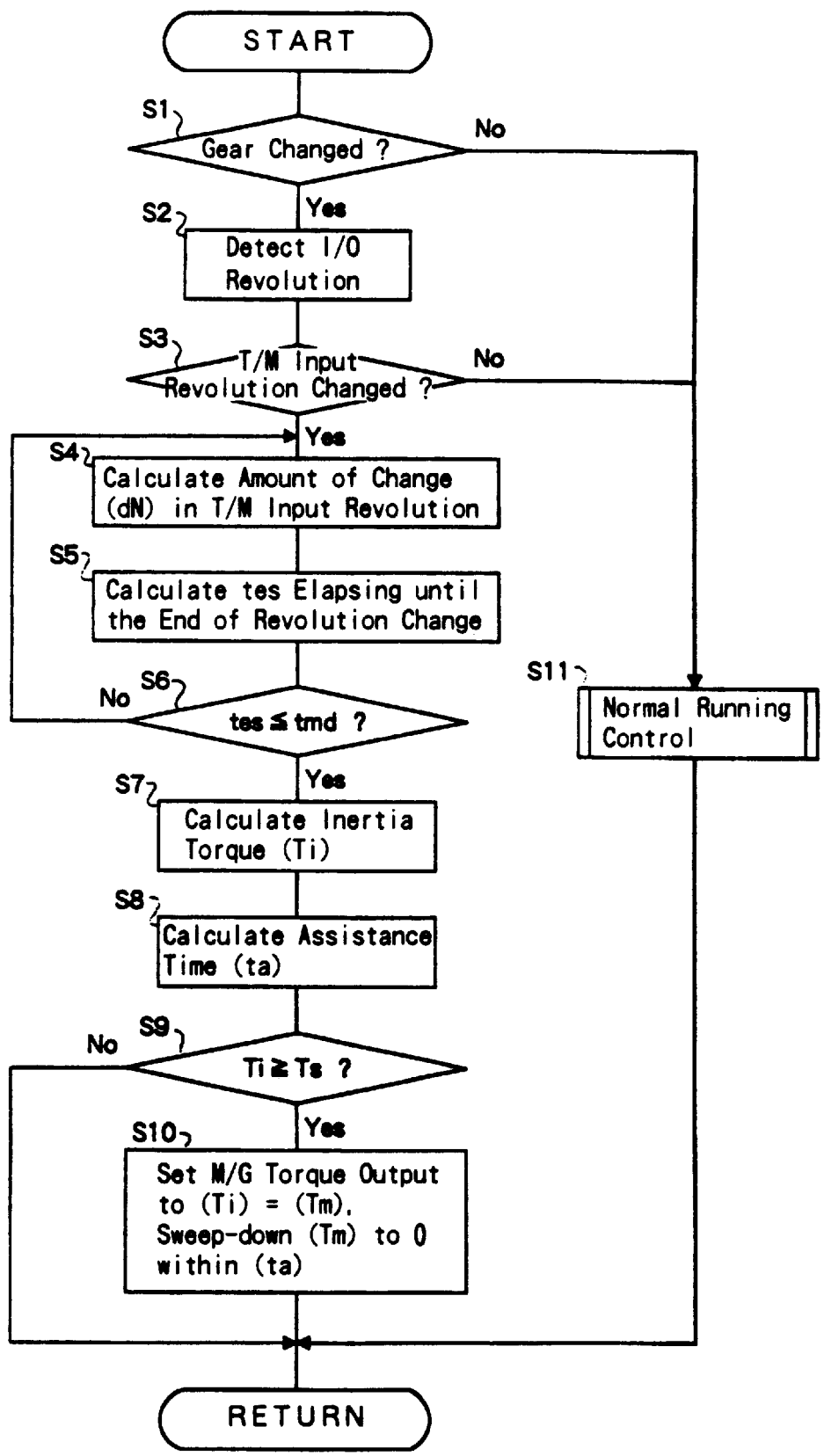
FIG. 2 is a flowchart showing a series of torque assistance control processes according to the first embodiment.

Referring to a flowchart of FIG. 2, first at step S1, it is determined whether or not a shift signal has been outputted, that is, a shift operation has been performed. If NO in step S1, the program invariably proceeds to step S11, where normal running control is executed by controlling outputs of the engine (E/G) or the motor generator (M/G) in accordance with a throttle opening.

If YES in step S1, the program proceeds to step S2 where input/output revolutions are read from an actual value of the transmission input revolution detected by the input revolution sensor 81 and an actual value of the transmission output revolution (Nout) detected by the vehicle speed sensor 82. Alternatively, it is possible to use the engine revolution that can be fetched from the engine control computer 7, which is substantially equal to the actual input revolution in the vehicle driving unit of the first embodiment. The revolution fetched from a resolver attached to the motor generator may also be used because the engine 1 and the motor generator 4 are locked up.

In the next step S3, it is determined whether or not the input revolution has changed with respect to the gear ratio and the output revolution. The start of the revolution change indicates that the friction engagement elements have entered an inertia phase. If YES in step S3, the program proceeds to step S4, where an amount of change (dN) in transmission (T/M) input revolution is calculated. In step S5, the time period (tes) remaining until the end of the revolution change is calculated based on the amount of change (dN) determined in step S4.

In step S6, it is determined whether or not the calculated time period (tes) remaining until the end of the revolution change is equal to or less than a predetermined time period (tmd). It is practically difficult to cause the motor generator to generate a torque immediately after the end of revolution change. This is because there is a certain delay of time taken for such a process as signal transmission between computers. Therefore, the aforementioned determination process step is necessary to prepare to generate the torque of the motor generator 4 just prior to the end of the shift operation (before expiration of (tmd)) in order to compensate for the delay.

In step S7, an inertia torque (Ti) is calculated using the following equation;

$$i = I \times dN.$$

where I stands for a moment of inertia. In step S8, a torque assistance time (ta) is set in accordance with the calculated inertia torque (Ti). The torque assistance time (ta) is set such that the rate of a change in the output torque (gradient) is kept constant.

In step S9, it is determined whether or not the inertia torque (Ti) is equal to or more than a predetermined value (Ts). If NO in step S9, that is, if it is determined that the inertia torque (Ti) is smaller than the predetermined value (Ts), the shift shock is considered to be negligible. Therefore, the program is terminated without executing torque assistance control. If YES in step S9, that is, if it is determined that the torque assistance is required, the program proceeds to step S10. In step S10, a torque (Tm) output from the motor generator 4 is equalized to the inertia torque (Ti), i.e., (Ti=Tm). Concurrently, the output torque (Tm) of the motor generator 4 is decreased over time to zero within the torque assistance time (ta).

Figure 3:
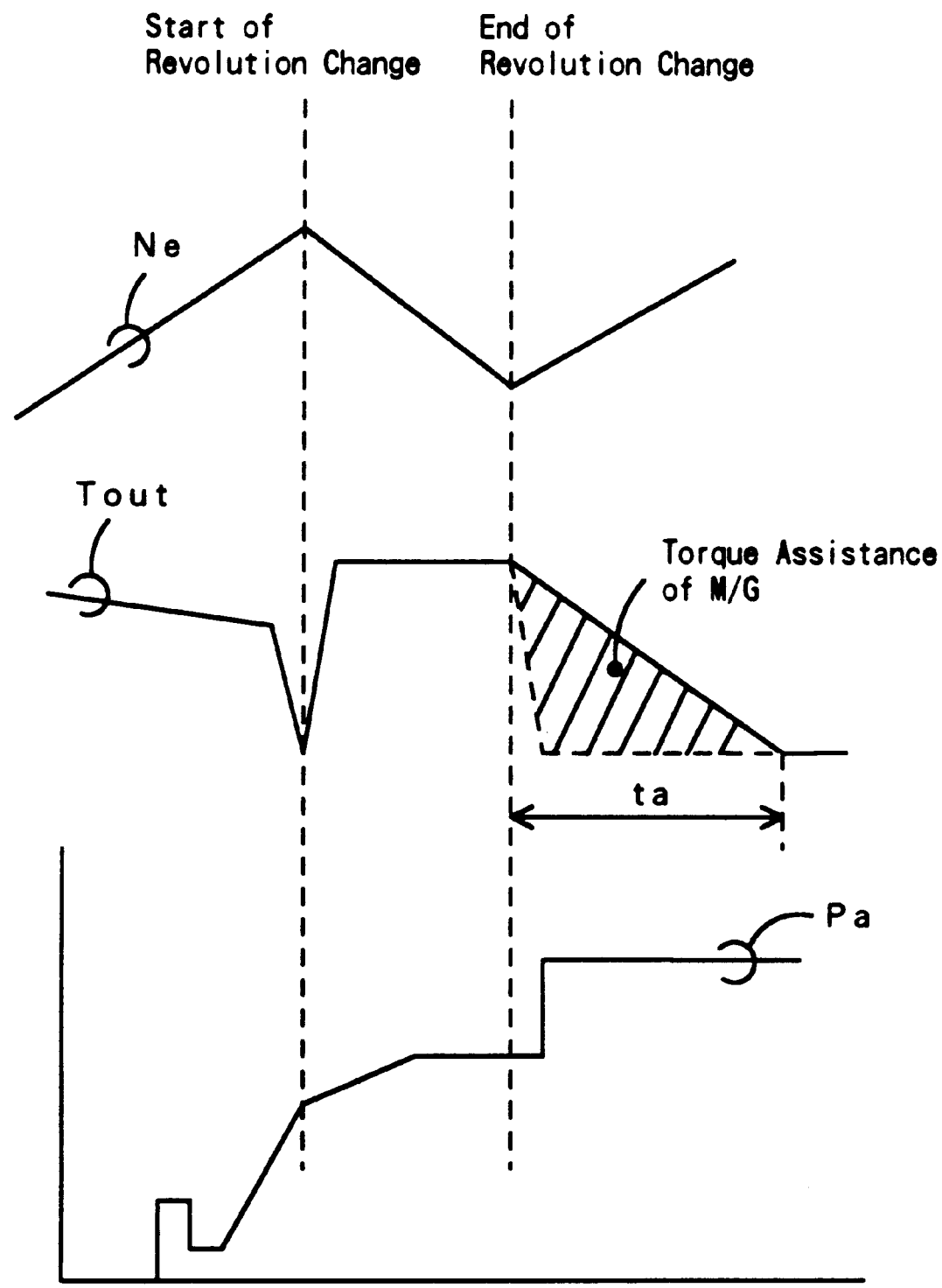
FIG. 3 is a timing chart representing a shift operation under the torque assistance control.

FIG. 3 is a timing chart for a upshift operation, which is a typical example of the torque assistance control as described above. Referring to the timing chart, at an initial stage, the transmission input revolution (Ne) assumes a high value corresponding to a lower gear stage prior to the shift operation. The value of the (Ne) gradually increases as the vehicle is accelerated. The value of the engagement hydraulic pressure assumes zero, indicating a disengagement state. The value of the output torque (Tout) gradually decreases as the vehicle is accelerated.

Referring back to FIG. 2, when step S1 determines that the shift signal has been outputted, the hydraulic control device outputs an engagement pressure applied to the friction engagement elements. The friction engagement elements enter an inertia phase due to the increase over time of the engagement hydraulic pressure level, thus transmitting the torque. Then, the transmission output torque (Tout) decreases and the input revolution (Ne) starts to change, which causes a shift state. Step S3 determines whether or not the input revolution has started to change. The revolution change is shown by a declining line in FIG. 3. Upon the beginning of the revolution change, the transmission output torque (Tout) increases sharply to reach a value greater than an input torque of an engine prior to declination by an amount of the generated inertia torque.

At this timing, the program starts to calculate an amount of change (dN) in transmission input revolution in step S4 and starts to calculate the time period (tes) remaining until the end of the revolution change in step S5.

When the shift state proceeds to reach the timing which is (tmd) prior to expiration of the time (tes) remaining until the end of the revolution change, the inertia torque (Ti) is calculated in step S7 and the assistance time (ta) is calculated in step S8 based on the determination made in step S6 whether or not little time is left before termination of the shift operation. A command for outputting the torque is generated in step S10. At the transmission side, the input revolution (Ne) is synchronized with the revolution at a gear stage after the upshift operation, which terminates the revolution change. Then, the inertia torque is quickly absorbed by the friction engagement elements. The transmission output torque (Tout) tends to decline to a lower output torque corresponding to a running load at the gear stage after the upshift operation as shown by a broken line of the timing chart of FIG. 3. As the assistance torque is output in accordance with the declination, the transmission output torque decreases gently at a descending gradient shown by a solid line of the timing chart. The descending gradient matches the decrease over time of the output torque of the motor generator performed in accordance with the assistance time (ta) calculated in step S8.

Figure 4:
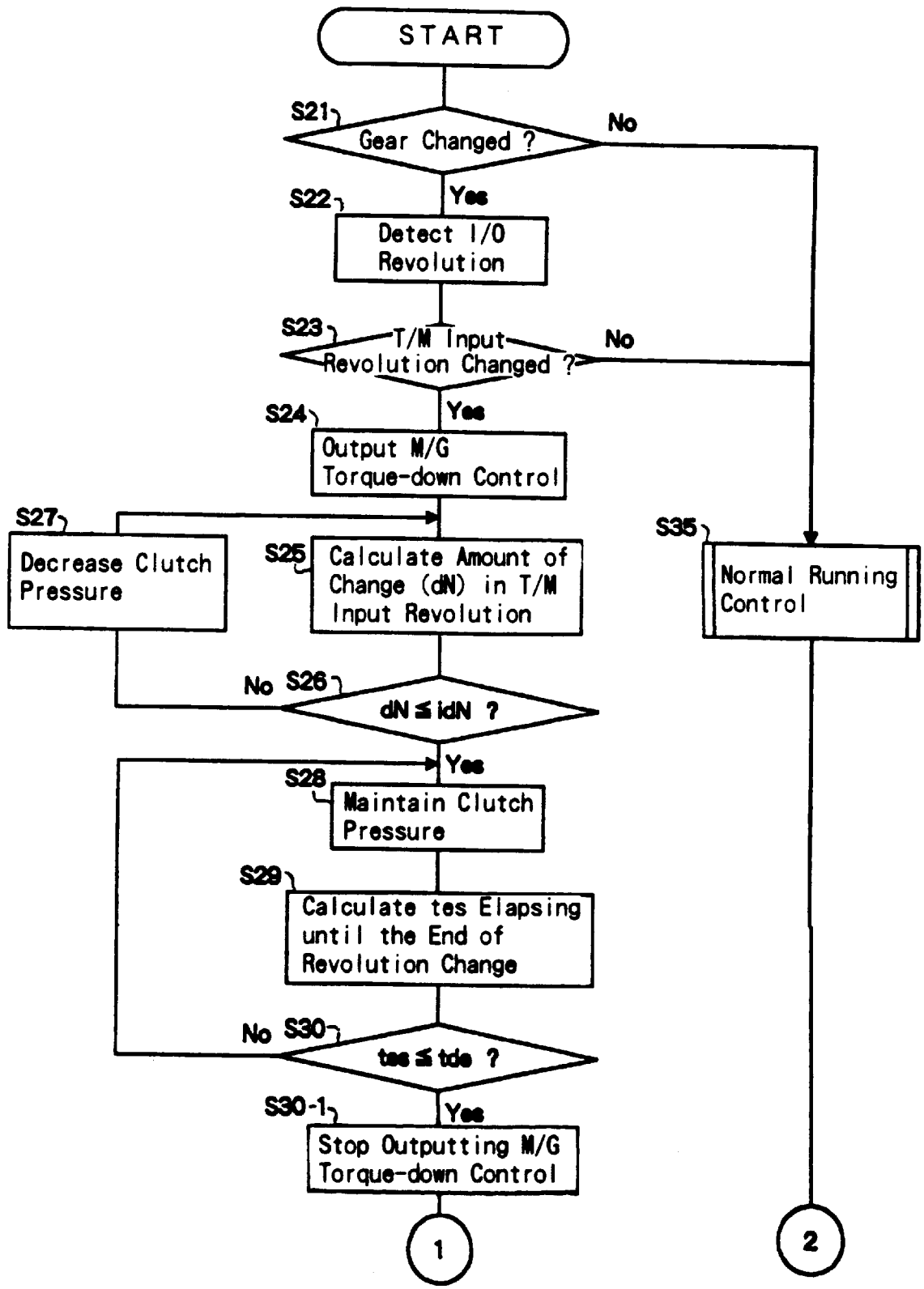
FIG. 4 is a beginning part of a flowchart showing a series of torque-down and torque-assistance control processes according to a second embodiment of the invention.
Figure 5:
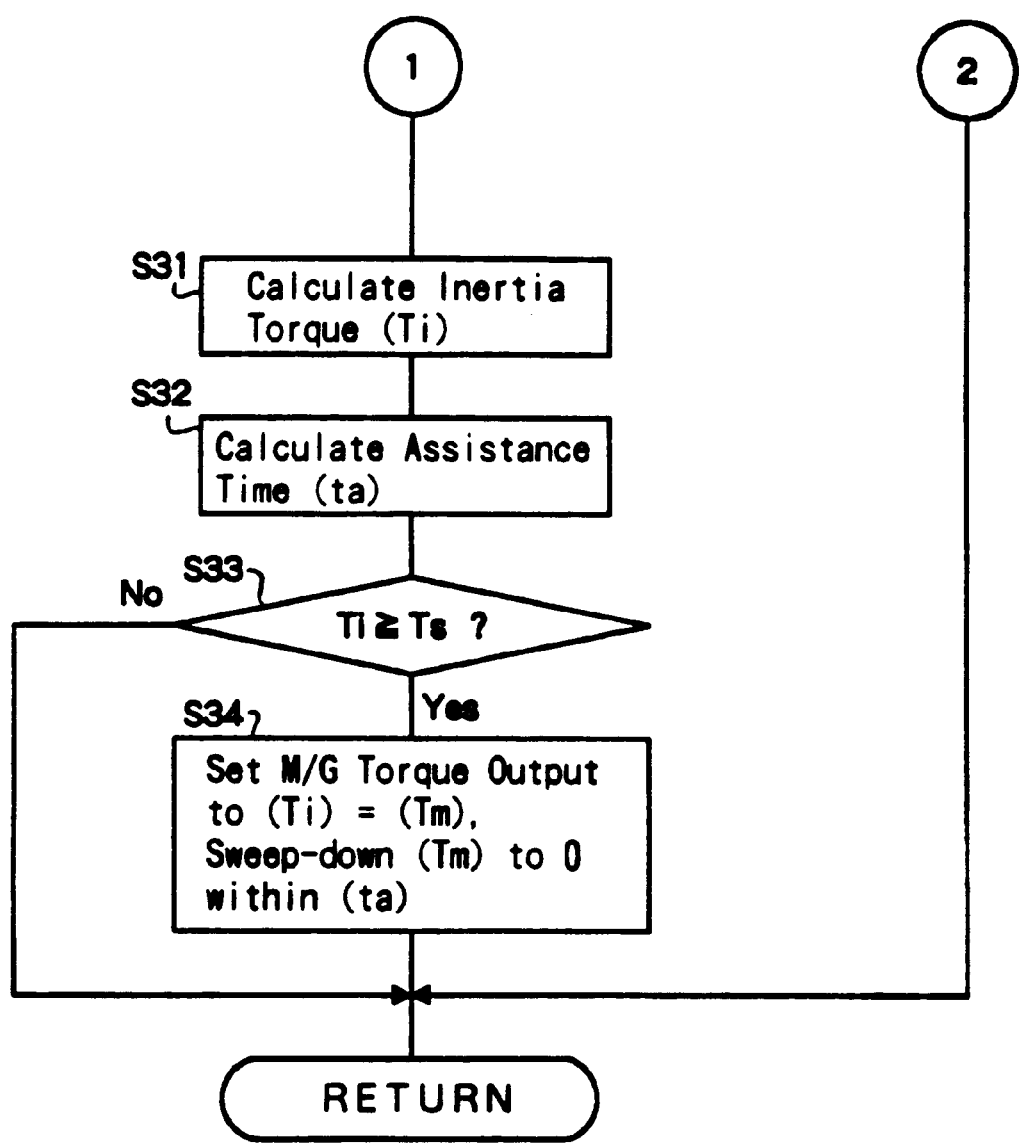
FIG. 5 is an ending part of the flowchart started in FIG. 4.
Figure 6:
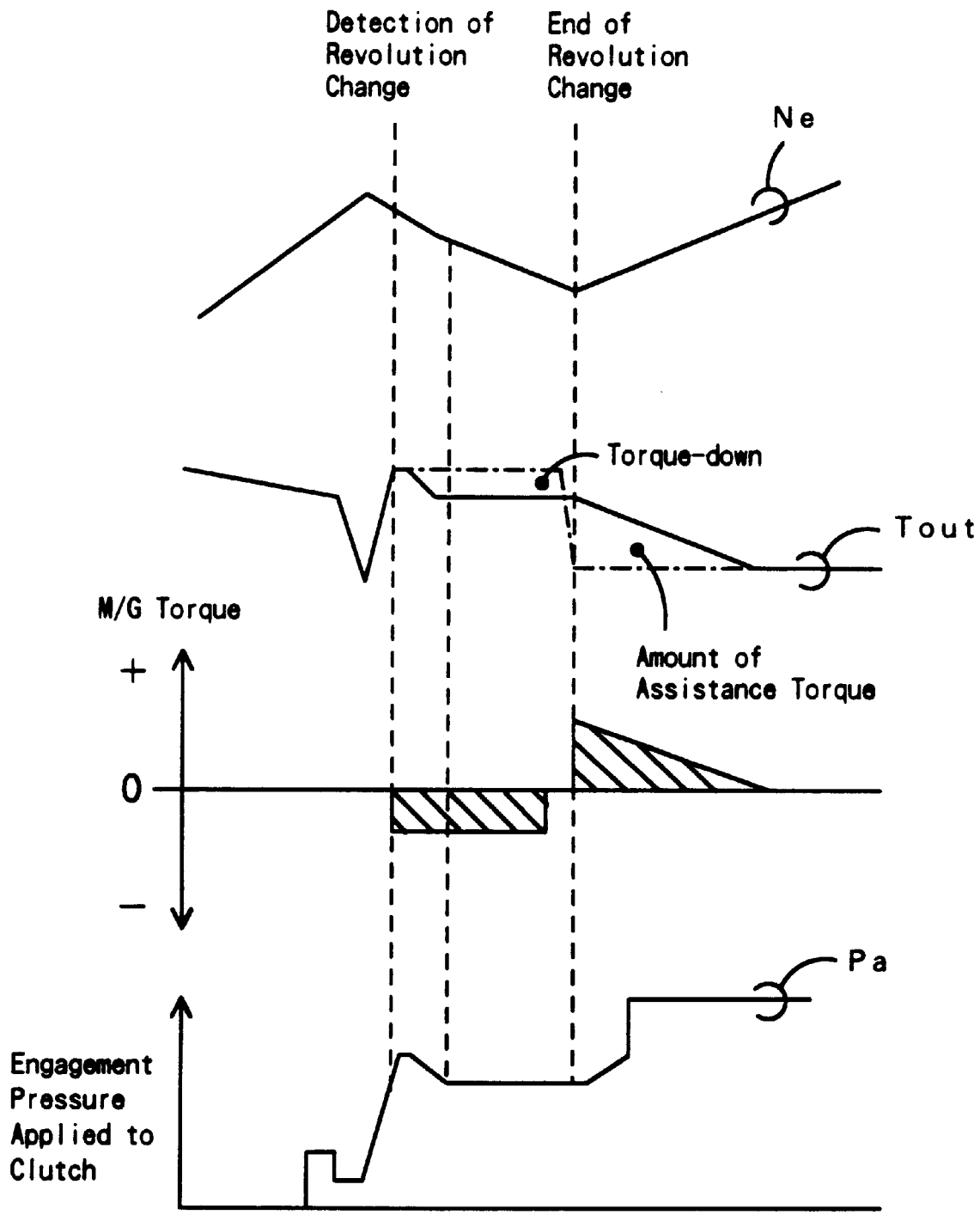
FIG. 6 is a timing chart representing a typical example of a shift operation under the torque-down and torque-assistance control.
Figure 7:
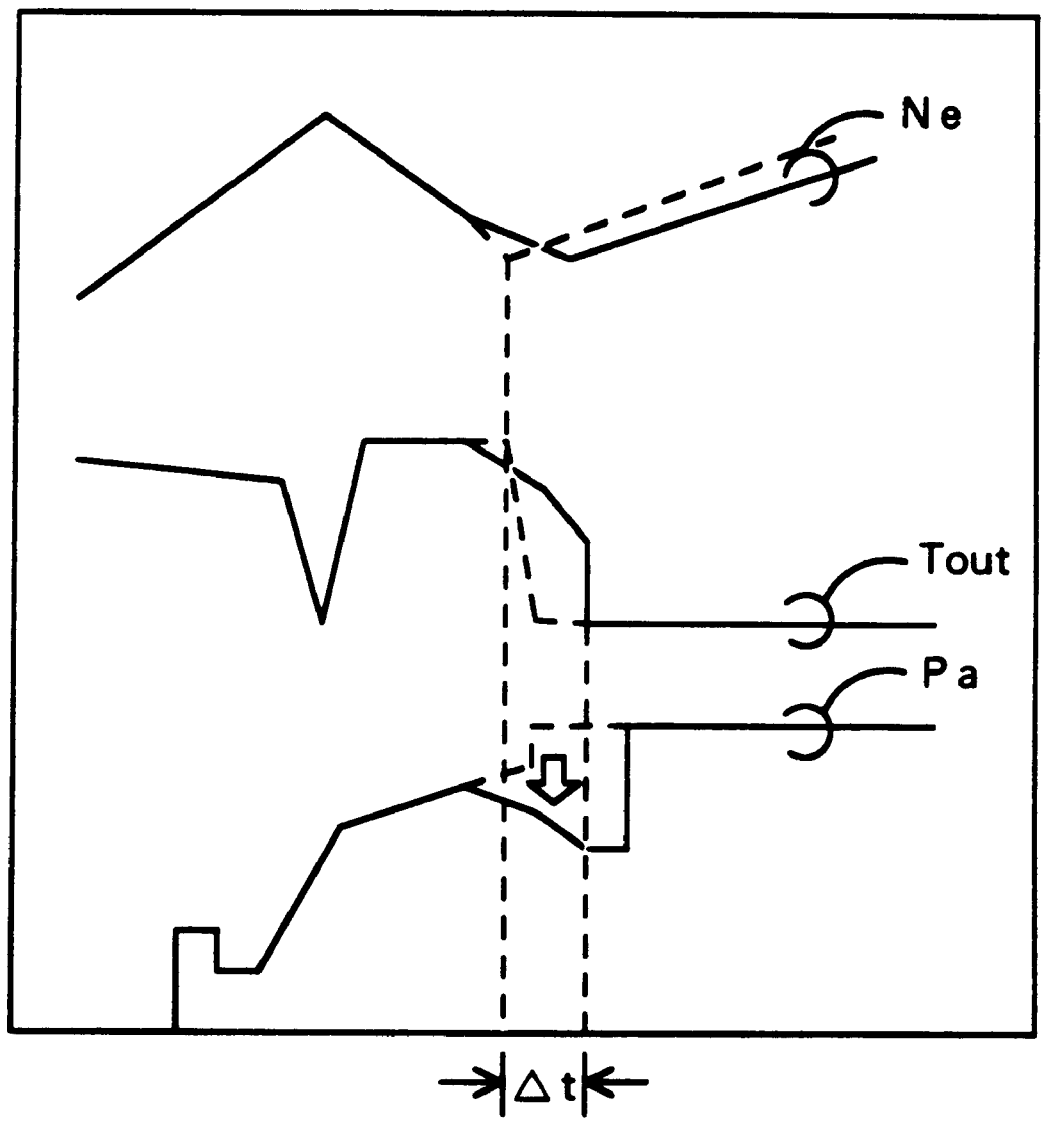
FIG. 7 is a timing chart of a generally employed hydraulic shift control process.

Referring to FIGS. 4 to 6, a second embodiment of the invention will be described. This embodiment is obtained by adding torque-down control to the torque assistance control of the first embodiment. In the second embodiment, as shown in flowcharts of FIGS. 4 and 5, steps S21 to S23 and steps S31 to S34 related to the torque assistance control are substantially the same as steps S1 to S3 and S7 to S10 of the flowchart of the first embodiment. Therefore, the explanation of those steps will be omitted. The torque-down control characteristic of the second embodiment will be described.

The program starts the torque-down control in step S24, where the motor generator functions as a generator to decrease the transmission input torque by a predetermined amount. The predetermined decrease amount of the torque is defined by the type of a shift operation and an engine revolution, which is stored in a memory as map data. In step S25, an amount of change (dN) in transmission (T/M) input revolution is calculated. In step S26, it is determined whether or not the calculated amount of change (dN) is equal to or less than an ideal amount of change in revolution (idN). In this case, the hydraulic pressure is set without executing the torque-down control. In accordance with the torque-down control executed in step S24, the shift operation is likely to be performed at a high rate. If NO in step S26, that is, if the shift operation is performed at an excessively high rate, the engagement pressure applied to the friction engagement elements decreases in step S27 so as to modify the rate of the shift operation to an ideal value. If YES in step S26, the engagement hydraulic pressure applied to the friction engagement elements is maintained in step S28.

Subsequently, in step S29, the time (tes) to elapse until the end of the revolution change is calculated based on the amount of change (dN) in the same manner as performed in the torque assistance control. In step S30, it is determined whether or not the time (tes) is equal to or less than a predetermined value of time (tde). Although the control process steps subsequent to step S30 are different from those of the first embodiment, the reason for executing the controlling is substantially the same as that of the first embodiment. It is practically difficult to switch the output of the motor generator from the down (negative) side to the up (positive) side simultaneously with the end of the revolution change. This is because there is a certain delay of time taken for such a process as signal transmission between computers. Therefore, the aforementioned determination process step is necessary to output the torque-down termination command prior to the end of the shift operation (before expiration of the time (tde)) in step S30-1 and to cause the motor generator to terminate the torque-down control. The following steps S31 to S34 relate to the torque assistance control, which are the same as steps S7 to S10 of the first embodiment.

FIG. 6 is a timing chart for an upshift operation, which is a typical example of the torque assistance control to which the torque-down control is added. The program starts to perform the control substantially in the same manner as in the first embodiment. Referring to FIG. 4, when it is determined that the shift signal has been outputted in step S21, the hydraulic control device outputs an engagement pressure applied to the friction engagement elements (not shown in the flowchart). The subsequent control process will be the same as that executed in the first embodiment. That is, the engagement hydraulic pressure is increased over time, the friction engagement elements enter an inertia phase and transmission of the torque is initiate&. The transmission output torque (Tout) declines and the input revolution (Ne) starts to change (as shown by a steep declining line of FIG. 6), leading to a shift state. Referring back to FIG. 4, step S23 determines the start of the revolution change. The program proceeds to step S24, where the motor generator 4 immediately starts outputting a negative (minus) torque. In response to the start of revolution change, the transmission output torque (Tout) sharply increases, reaching a value greater than the input engine torque prior to decline thereof by an amount of the inertia torque generated during the revolution change. The torque-down control is performed such that the transmission output torque decreases to a desired engine torque. Likewise, the engagement hydraulic pressure decreases in accordance with the decreased Tout. The descending gradient of the input revolution (Ne) becomes gentle as shown in FIG. 6, keeping an optimum shift time.

When the shift state reaches the time which is (tde) prior to expiration of the time period (tes) to elapse until the end of the shift operation, step S30-1 stops generating torque-down outputs based on the determination in step S30. The program proceeds to the torque assistance control. In this control process, the transmission output torque during the shift operation is reduced by executing the torque-down control and decreasing the engagement pressure. Therefore, the torque assistance amount to be supplied after the end of the shift operation decreases.

The invention employs the motor generator 4 to provide such assistance that the transmission output torque (Tout) does not decline after the end of revolution change. As a result, the transmission output torque (Tout) decreases gently. An inertia torque is derived from a rate of change in engine revolution during the shift operation. When the engine revolution has stopped changing, the motor generator 4 outputs the derived inertia torque. Then, the motor generator torque is decreased over time down to zero within a predetermined time period (ta). The predetermined time period (ta) for decreasing the motor generator torque over time is defined by the inertia torque.

While the invention has been described with reference to two preferred embodiments thereof, it is to be understood that the invention is not limited to the disclosed embodiments or construction. To the contrary, the invention is intended to cover various modifications and equivalent arrangements included within the spirit and scope of the appended claims.

What is claimed is:

1. A control system for a vehicle driving unit including a driving source formed by combining an engine with a motor generator, and a multi-stage automatic transmission for accomplishing a predetermined speed by engagement of friction engagement elements, the control system comprising:

shift operation termination determination means for determining a length of time remaining until the termination of a shift operation being performed by engagement of said friction engagement elements; and torque output command means for generating and transmitting a torque output command to said motor generator such that an output torque from said motor generator is gradually decreased over time from a predetermined torque value in response to a determination that said length of time remaining until the termination of said shift operation is less than a predetermined time period.

2. The control system according to claim 1, further including:

input revolution detection means for detecting an input revolution of said automatic transmission; and inertia torque calculation means for calculating an inertia torque input to said automatic transmission during said shift operation based on a change in said input revolution detected by said input revolution detection means and said calculated inertia torque corresponding to said predetermined torque value.

3. The control system according to claim 2, further including:

output command selection means for comparing said calculated inertia torque with a predetermined inertia torque value and stopping transmission of said torque output command to said motor generator when said calculated inertia torque is equal to or less than said predetermined inertia torque value.

4. The control system according to claim 1, further including:

output torque decrease rate setting means for setting a rate at which said output torque from said motor generator decreases gently, and said torque output command means generating and transmitting said torque output command to said motor generator based on said rate such that said output torque from said motor generator decreases at a constant rate every time said shift operation is performed.

5. The control system according to claim 1, wherein said torque output command means generates and transmits said torque output command to said motor generator such that said output torque from said motor generator becomes negative during the shift operation.

6. A method of controlling a vehicle drive unit including a driving source formed by an engine with a motor generator, and a multi-stage automatic transmission for accomplishing a predetermined speed by engagement of friction engagement elements, the method including the steps of:

determining a length of time remaining until the termination of a shift operation being performed by engagement of said friction engagement elements; and outputting a torque command to the motor generator to gradually decrease an output torque produced by said motor generator over time from a predetermined torque value in response to a determination that the length of time remaining until the termination of the shift operation is less than a predetermined time period.

7. The method according to claim 6, further including the steps of:

detecting an input revolution of the automatic transmission; and calculating an inertia torque input to said automatic transmission based on a change in said detected input revolution and setting said predetermined torque value approximately equal to said calculated inertia torque.

8. The method according to claim 7, further including the steps of:

comparing said calculated inertia torque with a predetermined inertia torque value, and stopping said output of said torque command to the motor generator when the calculated inertia torque is less than or equal to the predetermined inertia torque value.

9. The method according to claim 6, further including the steps of:

setting a rate at which said output torque from said motor generator decreases gently, and outputting said torque command to the motor generator based on the set rate such that said output torque from said motor generator decreases at a constant rate every time said shift operation is performed.

10. The method according to claim 6, wherein: the torque command output to the motor generator causes the motor generator to produce a negative torque during the shift operation.

11. A recording medium on which is recorded a control program for controlling a vehicle drive unit including an engine in combination with a motor generator and a multi-stage automatic transmission for establishing a desired vehicle speed by engagement of friction engagement elements, the control program including instructions for:

determining a length of time remaining until the termination of a shift operation being performed by engagement of said friction engagement elements; and outputting a torque command to the motor generator to gradually decrease an output torque produced by said motor generator over time from a predetermined torque value in response to a determination that the length of time remaining until the termination of the shift operation is less than a predetermined value.

12. The recording medium according to claim 11, wherein the control program further includes instructions for:

detecting an input revolution of the automatic transmission; and calculating an inertia torque input to said automatic transmission based on a change in said detected input revolution and setting said predetermined torque value approximately equal to said calculated inertia torque.

13. The recording medium according to claim 12, wherein the control program further includes instructions for:

comparing said calculated inertia torque with a predetermined inertia torque value, and stopping said output of said torque command to the motor generator when the calculated inertia torque is less than or equal to the predetermined inertia torque value.

14. The recording medium according to claim 11, wherein the control program further includes instructions for:

setting a rate at which said output torque from said motor generator decreases gently, and outputting said torque command to the motor generator based on the set rate such that said output torque from said motor generator decreases at a constant rate every time said shift operation is performed.

15. The recording medium according to claim 11, wherein: the torque command output to the motor generator causes the motor generator to produce a negative torque during the shift operation.

* * * * *